(12) United States Patent
Franklin et al.

(10) Patent No.: US 11,965,490 B2
(45) Date of Patent: Apr. 23, 2024

(54) GRAVITY-BASED ENERGY STORAGE SYSTEM

(71) Applicant: Gravitricity Ltd, Edinburgh (GB)

(72) Inventors: Miles Franklin, Devon (GB); Peter Fraenkel, London (GB)

(*) Notice: Subject to any disclaimer, the term of this patent is extended or adjusted under 35 U.S.C. 154(b) by 304 days.

(21) Appl. No.: 17/623,048

(22) PCT Filed: Jun. 26, 2020

(86) PCT No.: PCT/EP2020/068043
§ 371 (c)(1),
(2) Date: Dec. 27, 2021

(87) PCT Pub. No.: WO2020/260596
PCT Pub. Date: Dec. 30, 2020

(65) Prior Publication Data
US 2022/0228572 A1     Jul. 21, 2022

(30) Foreign Application Priority Data
Jun. 28, 2019  (GB) .................................. 1909349

(51) Int. Cl.
*F03G 3/00*     (2006.01)
*H02K 7/02*     (2006.01)

(52) U.S. Cl.
CPC ............. *F03G 3/094* (2021.08); *H02K 7/025* (2013.01)

(58) Field of Classification Search
CPC ........... F03G 3/094; F03G 3/00; H02K 7/025; H02K 7/06
See application file for complete search history.

(56) References Cited

U.S. PATENT DOCUMENTS

| | | | |
|---|---|---|---|
| 8,618,680 B2 | 12/2013 | Khoshnevis |
| 8,901,758 B1 | 12/2014 | Nix |
| 9,797,384 B2 | 10/2017 | McGrath |
| 2009/0193808 A1 | 8/2009 | Fiske |

(Continued)

FOREIGN PATENT DOCUMENTS

| | | |
|---|---|---|
| CN | 202300407 U | 7/2012 |
| CN | 102953943 A | 3/2013 |

(Continued)

*Primary Examiner* — Mohamad A Musleh
(74) *Attorney, Agent, or Firm* — Thomas P. O'Connell; O'Connell Law Firm

(57) ABSTRACT

An energy storage system and method that enables gravity-based energy storage to have a significantly larger capacity in a single shaft for given capital cost and thus an improved cost per unit energy for large scale energy storage as well as enabling continuity of power input and output at an external connection point across the extent of the system's energy capacity comprises a multi-weight storage system having at least two weights, two transporters each with a transporter linkage that can be coupled to and decoupled from the respective weight and for transporting the weight along a pre-defined path defining a vertical displacement and defining a respective path volume, a second linkage path volume defined by the area of the second linkage decoupled from a weight and developed or swept along a respective pre-defined vertically displaced path, wherein the second linkage path volume does not overlap with the first path volume.

28 Claims, 7 Drawing Sheets

(56) References Cited

U.S. PATENT DOCUMENTS

2011/0241354 A1* 10/2011 Khoshnevis .............. H02P 9/04
290/1 C
2015/0048622 A1    2/2015 Schegerin

FOREIGN PATENT DOCUMENTS

| | | |
|---|---|---|
| CN | 203655299 U | 6/2014 |
| CN | 208456596 U | 2/2019 |
| DE | 4135440 A1 | 4/1993 |
| DE | 10037678 A1 | 2/2002 |
| DE | 102006003897 A1 | 8/2007 |
| DE | 202012006622 U1 | 9/2012 |
| FR | 2987516 A1 * | 8/2013 .............. F03G 3/00 |
| JP | S5634981 A | 4/1981 |
| JP | S5818572 A | 2/1983 |
| JP | H06147097 A | 5/1994 |
| JP | 2012026089 A | 2/2012 |
| SU | 514957 A | 5/1976 |
| WO | WO2013005056 A1 | 1/2013 |
| WO | WO2013050343 A2 | 4/2013 |
| WO | WO2018134620 U | 7/2018 |

* cited by examiner

GRAVITY-BASED ENERGY STORAGE SYSTEM

FIELD OF THE INVENTION

This invention pertains generally to the field of energy storage and in particular to an apparatus and system for gravity-based energy storage using weights.

BACKGROUND OF THE INVENTION

Gravity-based energy storage systems are increasingly being recognised as one method of energy storage and grid balancing that is reliable, can operate over a very large cycle life and demonstrates a high efficiency. Large scale pumped-hydro, which also depends on gravity, is well known, but recently innovations in weight and shaft, and in particular weight and cable systems are offering improvements in energy storage using solid weights as well as benefits in energy capacity to meet local and national grid needs and improved response times.

For example, WO-A-2014/131806 and WO-A-2018/134620 describe the use of winch and cable arrangements to raise and lower weights in a shaft for the provision of temporary storage of energy from an external power system and supply to the external power system when required.

Several systems exist in which multiple weights are used in a single shaft to increase energy capacity and improve economic efficiency (having less capital expenditure on shafts and land cost). For example, US-A-2015/0048622 describes numerous embodiments of using multiple weights to provide energy storage of increased capacity. Similarly, DE-A-4135440 illustrates a multi-weight arrangement in a single shaft with external storage at top and bottom. Such multiple weight and cable gravity-based energy storage systems suffer from a particular shortcoming, which is that whilst they have an enhanced energy capacity, they are subject to a discontinuity in power input or output during storing (or charging) and releasing the full energy capacity. The discontinuity is a consequence of there being end points in the vertical transport of individual weights and the associated cable disconnection and cable movement to connect to a subsequent weight and due to the need for the transport of a weight to slow-down as it approaches the end of its travel.

To be economically advantageous and provide high quality power receipt from or supply to an external power system, an energy storage system is advantageously providing a large energy capacity and a continuous input/output across that capacity.

The present inventors have identified improvements in energy storage systems which address the shortcoming of existing art.

Problem to be Solved by the Invention

There is a need for improvements in energy storage systems to provide larger capacity and higher quality energy storage via cable and weight gravity-based systems more cost effectively.

It is an object of this invention to provide an energy storage systems which enables the full energy capacity of a multi-weight gravity-based energy storage systems to accept and/or deliver power without interruption or discontinuity at the external system connection point.

SUMMARY OF THE INVENTION

In accordance with a first aspect of the invention, there is provided a multi-weight gravity-based energy storage system comprising:
  a first weight;
  a second weight;
  a first transporter comprising a first transporter linkage which may be coupled to and decoupled from the first weight for mechanically linking the first weight to the first transporter, the first transporter configured for transporting the first weight along a first pre-defined path defining a vertical displacement between a first upper position and a second lower position;
  a second transporter comprising a second transporter linkage which may be coupled to and decoupled from the second weight for mechanically linking the second weight to the second transporter, the second transporter configured for transporting the second weight along a second pre-defined path defining a vertical displacement between a first upper position and a second lower position;
  a first path volume defined by the first weight coupled with the first transporter linkage developed or swept along the first pre-defined path;
  a second path volume defined by the second weight coupled with the second transporter linkage developed or swept along the second pre-defined path, wherein at least a portion of the second path volume overlaps with the first path volume; and
  a second linkage path volume defined by the second linkage decoupled from a weight and developed or swept along a respective pre-defined path between an upper position and a lower position,
wherein the second linkage path volume does not overlap with the first path volume.

In a second aspect of the invention, there is provided a method of energy storage that uses a system as defined above.

In a third aspect of the invention, there is provided a method of energy storage in a multi-weight gravity-based energy storage system for providing continuity of power input and/or output to the system without interruption or discontinuity across the full energy capacity thereof, the method comprising providing a multi-weight gravity-based energy storage system as defined above and operating the energy storage system so as to cause the raising and lowering of successive weights according to a power input/output requirement for the system and cause the system to slow the rate of raising or lowering of a weight as it approaches an extremity of its path and start another weight moving so as to compensate for the reduction in power input/output resulting from the first weight slowing and stopping at the end of its path, whereby the input/output from the system can be provided at required power on a continuous basis for the duration of the raising or lowering of at least two successive weights.

In a fourth aspect of the invention, there is provided a method of energy storage in a multi-weight gravity-based energy storage system comprising at least two weights configured for raising and lowering along respective pre-defined paths by way of transporters and which system comprise a controller for controlling the operation of the transporters and movement of the weights in response to a requirement for storage of excess energy from or discharge of energy to an external system, the method comprising moving at least two weights along their pre-defined paths simultaneously in order to provide a short duration increased power input/output.

In a fifth aspect of the invention, there is provided a control system for continuous charge or discharge of energy in a multi-weight energy storage system as defined above.

In a sixth aspect of the invention, there is provided a winch and cable configuration comprising a winch, a single cable, and a sheave arrangement at a lower extremity of the arrangement, the cable configured to pass around two sheaves of the sheave arrangement in order to absorb differences in speed control between the two winches.

In a seventh aspect of the invention, there is provided a suspended platform system for providing a load bearing suspended platform within a shaft for an energy storage system of claim 1, the system comprising a platform element, a plurality of suspension members engaged with the platform element by which the platform element is suspended and an anchoring mechanism for anchoring the suspension members at a raised position relative to the platform element.

Advantages of the Invention

An energy storage system of the invention enables gravity-based energy storage to have a significantly larger capacity in a single shaft for given capital cost and thus an improved cost per unit energy for large scale energy storage as well as enabling continuity of power input and output at an external connection point across the extent of the system's energy capacity.

DETAILED DESCRIPTION OF THE INVENTION

Figure 1:
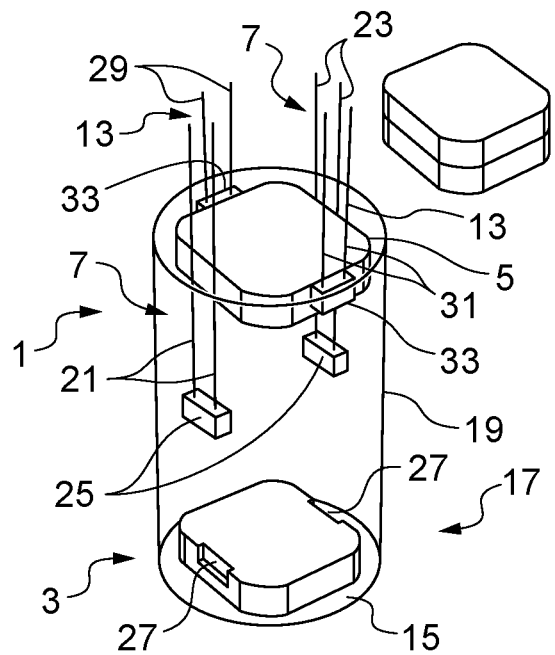
FIG. 1 illustrates in perspective view a representation of one embodiment of an energy storage system of the present invention.

The invention concerns an energy storage system, which is a multi-weight, gravity based energy storage system. The system comprises at least a first weight and a second weight and may preferably have a third weight and optional further weights. The system comprises a first transporter configured for transporting the first weight along a first pre-defined path defining a vertical displacement between a first upper position and a second lower position and a second transporter configured for transporting the second weight along a second pre-defined path defining a vertical displacement between a respective first upper position and a second lower position. The first transporter comprises a first transporter linkage which may be coupled to and decoupled from the first weight for mechanically linking the first weight to the first transporter. The second transporter comprises a second transporter linkage which may be coupled to and decoupled from the second weight for mechanically linking the second weight to the second transporter.

A first path volume is defined by the first weight coupled with the first transporter linkage developed or swept along the first pre-defined path. A second path volume is defined by the second weight coupled with the second transporter linkage developed or swept along the second pre-defined path. A second linkage path volume is defined by the second linkage decoupled from a weight and developed or swept along a respective pre-defined path between an upper position and a lower position. The path volumes may be considered as the respective two dimensional area covered, when an article (e.g. first weight, first transporter linkage, second weight, second transporter linkage or weight and transporter linkage together) is viewed from the perspective of the longitudinal axis of the pre-defined path, swept along the pre-defined path. In some cases and in a preferred embodiment, the respective two dimensional area covered is the maximum cross-sectional area and/or the path volume may be considered as the maximum cross-sectional area developed or swept along the respective pre-defined path.

In the system of the invention, at least a portion of the second path volume overlaps with the first path volume and the second linkage path volume does not overlap with the first path volume.

A first linkage path volume is preferably defined by the first linkage decoupled from a weight and developed or swept along a respective pre-defined path between an upper position and a lower position. The first linkage path volume preferably does not overlap with the second path volume.

Preferably, the system comprises at least three weights and more preferably more than three weights, for example, at least 5 weights, preferably at least 10 weights and optionally at least 20 weights, e.g. up to 50 weights. The appropriate number of weights can depend upon the depth of the shaft, the size of the weights and the energy capacity desired. In one embodiment, the system comprises from 6 to 20 weights. In another embodiment, the system comprises from 15 to 50 weights.

Thus, preferably, the energy storage system further comprises a third weight and optionally further weights, wherein the first and/or second transporter may be coupled to each of the third and optional further weights to secure respective mechanical linkages and configured for transporting the third and optional further weights along a third or further pre-defined paths defining a vertical displacement between a first upper position and a second lower position. Respective third and further path volumes are defined by the area of the third and further weights coupled with a respective transporter linkage (the first or second) developed or swept along respective pre-defined paths, which are preferably at least partially coincident with the first pre-defined path and/or the second pre-defined path. Preferably each of the third or any further path volumes overlap with at least the first path volume and preferably the second path volumes. More preferably, all of the third and further path volumes at least partially overlap with the first and second path volumes and still more preferably with each other.

In a particularly preferred embodiment, the first pre-defined path, the second pre-defined path and third and further pre-defined paths are preferably coincident along at least 50% of their lengths, more preferably along at least 70% and still more preferably at least 80% or may be the same.

By providing that the second and first path volumes (and optionally third and optional further path volumes) at least partially overlap, a multi-weight gravity energy storage system with multiple transporters (e.g. winches) allowing raising or lowering successive weights at the same time or successively with no or minimal interruption in energy storage or release operation can be provided for within a compact shaft, thus significantly reducing capital costs and the total cost of energy storage.

The system of the invention finds particular application in, and is preferably configured to, providing power input/output from the system at a required power on a continuous basis for the duration of the raising or lowering of at least two successive weights and preferably, 3 or more successive weights and preferably all the weights in the system. It is preferably achieved by way of a controller configured to cause the system to slow the rate of raising or lowering of a weight as it approaches an extremity of its path and start another weight moving so as to compensate for the reduction in power input/output resulting from the first weight slowing and stopping at the end of its path, whereby the input/output from the system can be provided at required power on a continuous basis for the duration of the raising or lowering of at least two successive weights.

Preferably, the first weight and second weight cannot pass one another along their respective paths.

Weight path volumes of each weight may be defined by the weight as it is swept along a pre-defined path (e.g. the two dimensional coverage or area of the weight when viewed from the perspective of the pre-defined path). Preferably, the weight path volumes of the first and second weights overlap and preferably the weight path volumes of the third and further weights overlap with the first weight path volume and preferably also the second weight path volume.

A medial swept weight area and a medial swept path area of each weight may be the area defined by a cross section of the path volume at a medial part of the path of the respective weight and the weight combined with transporter linkage. By a medial part of the path, it is meant a part in the middle portion, which is typically a middle third (rather than the first third of last third of the path).

Preferably, the medial swept path area of the second weight overlaps with that of the first weight. Preferably, the medial swept path area of any third and further weights overlaps with that of the first weight and preferably also the second weight and more preferably with that of each other weight.

Preferably, the medial swept path area of the first weight overlaps with that of the second weight (and preferably, independently, any third and further weights) by an amount of at least 50% of the medial swept path area of the second weight, preferably by at least 70%, still more preferably at least 80%, more preferably still at least 90% and most preferably at least 95%.

Preferably, the medial swept weight area of the first weight overlaps with that of the second weight (and preferably, independently, any third and further weights) by an amount of at least 50% of the medial swept path weight area of the second weight or respective third or further weights, preferably by at least 70%, still more preferably at least 80%, more preferably still at least 90%, more preferably at least 95%, still more preferably at least 98% and optionally entirely overlaps.

Preferably, the total combined medial swept path area of the first and second medial swept path areas is no more than e.g. 30% greater than that of the first and/or second medial swept path area, preferably no more than 20% greater, still more preferably no more than 15% greater and optionally no more than 10% greater. This is preferably the case for the total medial swept path area of all the weights.

Preferably, the at least a portion of the second path volume overlaps with the first path volume by an amount of at least 20% of the first path volume, preferably at least 30% and more preferably at least 50% and optionally at least 80%.

Preferably, the total volume of the first and second path volumes is no more than e.g. 30% greater than the volume of the first path volume, due to the extent of overlap, more preferably no more than 20% greater.

The multi-weight gravity-based energy storage system preferably comprises a plurality of weights movable between respective first upper positions and second lower positions, the first upper and second lower positions defining respective vertical displacements for each weight. Depending upon how the weights are stored at the upper and lower positions, the respective vertical displacements for each weight may be the same or different.

The pre-defined path according to the present invention may, for example, be vertical or an angle to the vertical. For example, the weights may be moved between their upper and lower positions by way of a trolley and rail arrangement or otherwise in the case of an angled path to the vertical or, by suspended raising and lowering using a winch and cable arrangement through a vertical path. Preferably the pre-defined path is a vertical path directly corresponding to the vertical displacement of the weights between their upper and lower positions. By vertical displacement, it is meant the vertical distance between a first upper position and a second lower position. Preferably, the first pre-defined path and the second pre-defined path each define a vertical path between respective first upper and second lower positions. Preferably, each pre-defined path defines a vertical path between respective first upper and second lower positions Preferably, the energy storage system comprises a shaft, at least a portion of the path of which the first and second pre-defined paths follow and more preferably any third and further pre-defined paths follow also.

The shaft may be formed in a tower, built above ground, or in a shaft or hole dug into the ground or partly formed in a tower above ground and a shaft in the ground. Optionally, a shaft may be formed against a face, e.g. a face of a cliff or a face of a tall building, according to which embodiments, a shaft housing may preferably be built against such a face. Preferably, the shaft is an enclosed shaft. A shaft may be enclosed, for example, by the walls of shaft dug in the ground, which is preferably lined, or by a tower housing, or a housing formed against a face (of a cliff or building) or a combination thereof. Preferably, the shaft is formed in the ground. A shaft in the ground for use in the system may be sunk specifically for the system or may be a redeployment of a pre-existing shaft (e.g. mine shaft).

A shaft for use in any storage system of a preferred embodiment of the invention may be of any suitable depth, e.g. from 10 m or from 50 m, but is preferably in the range of from 100 m to 4000 m. For example, a relatively shallow shaft may be provided that has a depth of up to 500 m, e.g. 100 m to 350 m. Alternatively and preferably, a relatively deep shaft may be provided that has a depth of greater than 500 m, preferably greater than 1000 m, e.g. from 1250 to 3000 m.

The shaft may have any suitable width (or cross-sectional extent) provided it can accommodate the path volumes of the weights. Preferably, they are in the range 1.5 m to 20 m, preferably at least 3 m, more preferably from 5 to 15 m, more preferably up to about 10 m.

In one implementation of the system of the present invention, the system may be deployed in pre-existing or modified existing shafts. These may be in the region of 300 to 5000 m and preferably have a diameter of 3 to 10 m. For example, pre-existing shafts (e.g. for existing coal shafts), may have a depth of from 300 to 1200 m and preferably a diameter of 5 to 7 m. Alternatively (e.g. for disused metal mine shafts in the UK), the depth may be from 50 to 750 m and preferably having a diameter of from 2.5 to 6 m, preferably 3 to 5 m (often a square or rectangular shaft of, for example 3 m by 5) m. In a further alternative, e.g. for pre-existing heavy metal/anhydrite mines in the UK, the shaft depth may be up to 1200 m and have a circular shaft of 5 to 8 m diameter. In a still further alternative, very deep shafts (e.g. pre-existing gold/heaving metal shafts, such as those in South Africa) may have a depth of, for example 1500 to 3000 m and preferably a diameter of 5 to 9 m.

In another implementation, new shafts may be sunk for the system. In one such embodiment, the new shaft may be from 30 to 120 m deep and preferably is sunk using traditional caisson technique. Such shafts may typically be from 6 to 25 m in diameter and generally circular in cross-section and preferably concrete lined. In another such embodiment, the shaft may be from 100 to 350 m deep and preferably sunk using automated vertical shaft sinking technology. Preferably these are generally circular in cross-section and have a diameter of 6 to 18 m. Again, the shaft is preferably concrete-lined. In a still further such embodiment, the shaft may be from 100 to 700 m and preferably formed by reverse circulation (e.g. pile top drilling) through hard rock. Preferably, this is generally circular in cross-section and has a diameter of from 3 to 8 m. Preferably, the shaft is slip-form concrete lined.

Generally, it is preferred that new shafts sunk for the system have a diameter in the range from 4 to 10 m and a depth of from 50 to 750 m, preferably 6 to 10 m diameter and 50 to 250 deep. For new shafts sunk in hard rock, it is preferred that the diameter is in the range of 4 to 6 m and the depth is from 400 to 700 m.

Preferably, the shaft has a cross-sectional area that is no more than 75% greater than the total combined medial swept path area of the first and second weights (with respective transporter linkages coupled thereto) and preferably also of the medial swept path areas of any third and further weights, preferably no more than 50% greater and optionally in the range of 5 to 30% greater, optionally at least 10% greater, e.g. up to 20% greater.

Optionally, each of the first weight and second weight and optionally any third or further weights are capable of coupling with either the first transporter linkage or the second transporter linkage, or alternatively with each of the first and second transporter linkages. In a preferred embodiment, each weight is configured such that it may engage with only the first or the second transporter linkage by providing only one set of opposing linkage docks on the weight.

The first and second transporters may be any suitable arrangement or mechanism for transporting the first and second weights along their respective paths.

Preferably, the first transporter comprises a winch and cable (or chain, preferably cable) arrangement and preferably also the second transporter comprises a winch and cable arrangement, which is preferably discrete from the first winch and cable arrangement. Each of the first and second winch and cable arrangements comprise one or more transporter linkages (linkage members disposed on or in relation to the cable arrangements) for coupling and decoupling from respective weights.

Preferably, each winch and cable arrangement comprises at least one winch disposed at or in relation to a shaft opening or rim at the top of a shaft. A cable may preferably be wound and unwound by the at least one winch to enable raising and lowering the weights via a linkage member associated with the cable.

A winch and cable arrangement may comprise any arrangement of sheaves or pulleys in order to configure the arrangement as desired and as may be understood by a person of ordinary skill in the art.

Preferably, each winch and cable arrangement comprises at least two winches, one disposed on each opposing side of a shaft entrance, each opposing winch cooperating with a cable and at least one linkage member for coupling and decoupling with a weight.

More preferably, each winch and cable arrangement comprises two opposing pairs of winches, disposed on opposing sides of a shaft entrance, each opposing pair of winches cooperating with a cable arrangement and at least one linkage member for coupling and decoupling with a weight.

Preferably each winch and cable arrangement is disposed about the top of the shaft in an orthogonal arrangement relative to the other.

Preferably, each transporter linkage comprises a linkage member for cooperating with a respective linkage dock on a weight.

In one embodiment, a linkage member is adaptable between a first configuration in which it is coupled with a weight, e.g. a linkage dock on the weight, and a second configuration in which it is decoupled. Preferably, when decoupled from a weight, the linkage member is capable of being raised and lowered by a winch and cable without colliding with weights in the shaft (e.g. because it is disposed to the side thereof). In a preferred embodiment, the linkage member in its first configuration has a protruding member, for example in the form of a sliding plate, extendable from the side of a body portion of the linkage member by way of one or more extending arms or actuators so that preferably it moves laterally from the body portion. When aligned with a linkage dock of a weight, the protruding member may be actuated to cause the linkage member to adopts its first configuration whereby the protruding member enters into a recess formed in a side surface of the weight. Preferably, where the protruding member is in the form of a sliding plate or otherwise has upwardly orientated elements, the recess has an upwardly orientated slot such that when the linkage member is then raised, the upwardly orientated elements (e.g. top edge of the sliding plate) of the protruding member engage into the slot of the recess thereby coupling the linkage member with the weight. The linkage member can be decoupled by reversing the process. Preferably actuation and deactuation are enabled via a hydraulic actuator, although it may alternatively be enabled by electric or other actuators.

The energy storage system of the present invention finds particular utility in storing excess energy from an external system or supply and releasing stored energy to the external system or external demand when needed. Typically the external system is an external power system such as a local or national electricity grid.

Preferably, the energy storage system comprises an input connection and an output connection, which may be a single connection point, to an external system (e.g. an external power system).

Preferably, the energy storage system comprises a motor to drive the transporters, which are preferably winch and cable arrangements, to lift one or more weights along their paths between a lower position and an upper (stored energy) position. This can charge the system. Preferably, the energy storage system comprises a generator to generate electricity for exporting to an external power system from energy output resulting from lowering one or more weights between an upper position and a lower position. This can discharge the system. Preferably, the generator is coupled with a winch of a winch and cable arrangement. Optionally, the motor and the generator are a single configured arrangement coupled with one or more winches.

Preferably, the system comprises a controller (e.g. a processor and software configured to control the system) for controlling the operation of the transporters and movement of the weights in response to a requirement for storage of energy from or discharge of energy to an external system.

Preferably, a controller or control system is configured to sense or receive a signal in relation to the demand from the external system (e.g. power grid) and initiate raising or lowering and/or adjust the rate of raising or lowering of a weight to exactly match the demand (or requirement) from the external system contemporaneously. As such, the controller or control system should be in signal communication with an external system (e.g. power grid) and configured to respond to the external system signals and with motors that drive the winches, in a preferred embodiment.

Preferably, the controller or control system is configured to sense when a weight is nearing the end of its pre-defined path, e.g. at the bottom of the shaft or near the bottom of the shaft close to the preceding weight, or near the top of the shaft, so that it can configure the system to slow the rate of raising or lowering of the weight as it approaches the extremity of its path and automatically start another weight moving such that it will seamlessly substitute for the reduction in power input/output resulting from the first weight slowing and stopping at the end of its path. Thus, the input/output from the system at the external connection can be provided at a continuous level. Optionally, the controller or control system may be pre-programmed to match the movement of a second weight as a first weight is slowed as it approaches the top or bottom of a pre-defined path and/or it is configured to response to sensor signals such as sensors on the transporters (e.g. winches) regarding the speed of cable movement or sensors within the shaft for detecting location and speed of weight.

The controller preferably is configured to control the passage of a linkage member between a raised position and a lowered position and vice versa in order to collect a further weight in order to continue the input/output with the raising or lowering of a third or subsequent weight. The controller preferably is configured to raise or lower such an unattached linkage member in order to arrive at the top or bottom of the pre-defined path in sufficient time to engage a further weight.

Preferably, the energy storage system has a fully charged (that is, energy storage at capacity) configuration in which all the weights have been raised to their respective upper positions and fully discharged (that is, energy storage at a minimum) configuration in which all the weights have been lowered to their respective lower positions.

The weights may be stored at or in relation to the upper and lower positions by any suitable means. For example, the weights may be stored in their respective path volumes at the bottom of the shaft (e.g. stacked on top of one another) and/or at the top of the shaft (e.g. one below another and retained by some retaining mechanism that still allows, for example, cables to pass). Weights may be stored in an upper storage space associated with the upper position, but outside the respective path volume at or close to the top of the shaft and/or in a lower storage space associated with the lower position, but outside the respective path volume at or close to the bottom of the shaft.

According to one embodiment, which is preferred, when in the fully discharged configuration, the first weight, when decoupled from a respective transporter, may be disposed on a base of the shaft within the first path volume, the second weight, when decoupled from its respective transporter, may be disposed on top of the first weight at the base of the shaft within the second path volume and any third or further weights are disposed or stacked on the respective preceding weight at the bottom of the shaft within the respective path volume. The path volumes for each weight in this case may thus be different (depending upon how the weights are stored at the top of the shaft) with (assuming a common upper position, outside of the shaft, for the weights) each successive lowered weight having a smaller path volume and a lower energy storage capacity (assuming the weights are of equal mass).

In another embodiment, when in fully discharged configuration, the decoupled first weight may be stored in a base storage space associated with the shaft outside of the first path volume and preferably the decoupled second and any third or further weights are stored in a storage space associated with the shaft outside of the respective path volumes. Any suitable base storage space may be used, but preferably a base storage conveyor is provided to transport each of the first weight and preferably the second and any third or further weights from their respective lower positions to a storage space outside their respective path volumes. The storage conveyor may take any suitable form, such as a rail track with movable platforms thereon, a conveyor belt, or a carousel which rotates a plurality of storage spaces through the shaft so that weights may be lowered into a free storage space at the base of the shaft and then rotated into a storage space revealing a further free storage space at the base of the shaft for receiving the next weight.

According to one embodiment, when in a fully charged configuration, the first weight, decoupled from its respective transporter, is stored within the first path volume at its upper position, the second weight, when decoupled from its respective transporter, is disposed vertically adjacent to the first weight within the second path volume at its upper position and any third or further weights are disposed adjacent to the respective preceding weight within the respective path volume at the respective upper position. This may be within the shaft or within a vertical path volume above the shaft opening.

According to another embodiment, when in a fully charged configuration, the first weight, decoupled from its respective transporter, is stored in an upper storage space outside of the first path volume, the second weight, decoupled from its respective transporter, is stored in an upper storage space outside of the second path volume and any third or further weights are stored in an upper storage space outside of the respective path volumes. Preferably, an upper storage conveyor is provided to transport each of the first weight and preferably the second and any third or further weights from their respective upper positions to a storage space outside their respective path volumes. The upper storage conveyor may comprise any suitable means such as a gantry crane and matrix storage arrangement and/or a carousel.

In one embodiment of the invention, where the weights are disposed and stacked on a base of the shaft in a discharged configuration, the base is effectively provided by a suspended platform suspended at a position above the actual base of a shaft. This is described in more detail in a further aspect of the invention below.

The weights may be of any suitable mass according to, for example, the total amount of energy storage required (having regard for the vertical displacement provided by the system).

Preferably, the second weight and preferably third and any further weights have a mass that is within 30% of the mass of the first weight, preferably within 20%, more preferably within 10% and still more preferably within 5% and most preferably within 1% and ideally identical with the mass of the first weight.

In one embodiment, the first weight has a mass in the range of from 25 to 1000 tonnes, preferably 50 to 500 tonnes. The weights are sized according to the particular application and that can be effectively handled by the system. Preferably, the weights are of similar or identical mass to one another. A typical weight, designed to provide a significant energy capacity in a suitable shaft may be, for example, from 250 to 750 tonnes, e.g. about 500 tonnes.

In one example, the energy storage system comprises a vertical shaft and disposed in relation there to a winch and cable arrangement as described above for raising and lowering multiple weights by way of storage of energy and release of stored energy and is applied in a shaft produced for this purpose. The dimensions selected for a newly sunk shaft may depend upon several geological and commercial factors. In one example, a newly sunk shaft, of generally circular cross-section, could be sunk with an inner diameter of 10 m and a depth of 200 m. The system may comprise weights of, say, 550 tonnes per weight. If 26 weights were incorporated into this energy storage system, stored within the shaft (stacked on top of one another) at their lowest point when discharged and stored outside the shaft when fully charged, the system could provide a deliverable energy storage capacity of 6.6 MWh assuming a generation efficiency of 94%. A similar energy rating could also be achieved with a larger number of smaller, lower mass weights.

In another aspect of invention, there is provided a suspended platform system for providing a load bearing suspended platform, the system comprising a platform element, a plurality of suspension members engaged with the platform element by which the platform element is suspended and an anchoring mechanism for anchoring the suspension members at a raised position relative to the platform element.

The suspended platform system is preferably suitable for disposing within a vertical shaft so that the platform element provides a load-bearing platform upon which weights in a gravity based energy storage system as defined above may be disposed. The suspended platform should be sized to fit within a shaft and the suspension members have a length to allow the platform element to be suspended at a point within the shaft a distance above the actual base of the shaft.

Preferably, the suspended platform system may be installed from the top of an existing shaft. This could help remove the need for any down-shaft workings and negate the need for workers to descent the shaft for installation work.

A suspended platform system of this aspect may also have the advantage that it can be used in existing shafts which have disadvantageous features at their lowermost region, such as abandoned machinery or water. Using this platform method could enable the energy storage system as defined above to operate without being affected by these features.

In another embodiment, sealing features may be installed to the side of or below the suspended platform to isolate the section of utilised shaft from the volume below the platform. This will be beneficial in scenarios where the lower section contains gasses which are dangerous for people, equipment or the environment such as the methane found in coal mines.

The platform element may be any suitable platform for supporting weights for use in an energy storage system as defined above. The platform element may, for example, be a frame element having engaging members or support members for receiving a weight and supporting the weight or may be a grid arrangement. In one embodiment, the platform element is a planar, rigid member and preferably a solid support member.

The suspension members may be any suitable members that may suspend a platform element within a shaft from a raised position, such as the top of a shaft. Preferably, a plurality of suspension members are provided, such as at least three, more preferably four or optionally five or six or more. The suspension members are preferably elongate members which may be engaged, preferably attached or mounted to the platform element which may be suspended therefrom in a shaft and which are preferably anchored via an anchoring mechanism at or near the surface.

The suspension members may optionally be rigid members, such as rod members, or preferably are flexible members such as cables.

Preferably, suspension members may extend into the shaft and thus have a length according to the depth to which the platform element is desired to be disposed. For example, the suspension members may have a length of, for example at least 50 m, preferably 100 to 1000 m, more preferably up to 500 m, e.g. 200 to 400 m.

The suspension members may be engaged with the platform element by any suitable means. For example, the suspension members (e.g. when cables), may be engaged with receiving channels disposed in an underside of the platform element or through sheaves disposed on the underside of the platform element whereby two opposing suspension members may be formed of a single cable extending from the top of a shaft down the shaft and engaged with the underside of the platform element and back up the shaft to the top. Preferably, however, the suspension members are affixed or otherwise securely engaged with connection points on an underside of the platform element, on the peripheral rim of the platform element or on an upper surface at a peripheral portion of the platform element.

Optionally, when the suspension members are cables, they may be provided with tensioning members, which may be adjusted to shorten the cable lengths in order to maintain a desired flat orientation of the platform element.

Optionally, the suspension members may act as guides to the weights being raised and lowered in the shaft when used with an energy storage system as defined above. The weights may be installed with rollers or skids to engage with the cables for this purpose. The roller or skids may include buffering means.

The anchoring mechanism may be any suitable means for anchoring the suspension members to allow them to suspend a platform element within the shaft. In one embodiment, the anchoring mechanism comprises one or more anchors in relation to each suspension member. For example, the anchor mechanism may comprise at least one ground engaging anchor such as a threaded anchor for threading into the ground to which a suspension member may be attached. For example, where the suspension members are cables, each cable may be anchored by at least one ground engaging anchor in the ground adjacent the opening of a shaft, for example a number of metres (e.g. 5 to 10 or even up to 20 metres from the opening of the shaft, e.g. rim of the shaft opening). In this embodiment, there may be further provided sheaves disposed in relation to the shaft opening or rim thereof across which the anchored cables may pass and then extend down into the shaft.

In an alternative and preferred embodiment, the anchor mechanism may comprise a load spreading anchor support, preferably disposed on the ground about the shaft opening and having or defining an aperture over (small or larger or the same size as) the opening of the shaft. The anchor support may optionally be a frame member. Preferably, the anchor support is a planar and more preferably plate member, e.g. a plate of steel or other metal, or of reinforced concrete (e.g. metal mesh reinforced concrete). Such an anchor support may be simply disposed on the ground over or about the opening of a shaft or may itself be anchored to the ground, e.g. at peripheral edges thereof. The lateral extent of the anchor support may be any suitable amount, but may typically be a total of from 5 to 25 m, preferably 10 to 20 m. Optionally, there may be a skirt member extending from the anchor support, typically from a rim of an aperture formed in the anchor support, preferably extending downward and may effectively line the upper portion of a shaft over which the anchor support is disposed. For example, the skirt may extend up to 15 m, e.g. 3 to 10 m into the shaft. The skirt may be made of any suitable material but is preferably rigid and more preferably is made of a similar structure to the anchor support, e.g. a steel tubular skirt or reinforced concrete skirt.

Suspension members, according to this general embodiment, may be affixed or secured to the anchor support member. They may, for example, be secured to mounting means on an upper surface or engaged with a peripheral edge of the anchor support (and provided with sheaves at a rim of an aperture in or defined by the anchor support), or mounted on or affixed to a rim of an aperture in or defined by the anchor support and/or, where present a skirt thereof.

Optionally, lateral projecting members may be provided for engaging shaft walls in order to stabilize the platform element or suspension members and/or to enable a degree of load bearing support by the shaft walls of the system. The lateral projection members may take any suitable form. Preferably, the lateral projecting members are rigid and optionally deployable from a retracted position (to facilitate installation) to a deployed position (in which they are engaged with a shaft wall). The lateral projecting members may be, for example, fold out, telescopic, hydraulic or threaded members or a combination thereof.

The lateral projecting members may be configured to abut against a shaft wall or may be configured to affix into a shaft wall.

Preferably, the lateral projecting members are disposed in association with the platform element. For example, they may be disposed or mounted beneath or on an underside of the platform element. In one embodiment, the lateral projecting members are configured to project from lateral edges of the platform element.

Optionally, the suspension members are provided with stiffening or support members at pre-defined positions on the length of the suspension members. Preferably the stiffening or support members are inter-connected so as to define a peripheral support frame, which preferably has an aperture to allow passage of a weight (as defined in the above energy storage system). Optionally the peripheral support frame is provided with lateral projecting members whereby the peripheral support frame may be engaged with a wall of the shaft in which the system is disposed to stabilize the peripheral support from and indeed suspension members and optionally may extend into the wall of the shaft, whereby the wall may provide load support to the system via the peripheral support frame. The lateral projecting members may independently be as defined above.

The platform element, when disposed in a shaft, preferably has a lateral dimension (excluding any projecting members) of 50 to 95% of the corresponding cross-sectional dimension of the shaft in which it is disposed.

The suspended platform system may preferably be incorporated, as a preferred embodiment, into an energy storage system as described above.

The invention will now be described in more detail, without limitation, with reference to the accompanying Figures.

In FIG. 1, an energy storage arrangement 1 is illustrated in which a first weight 3 is in a resting lower position 17 at the base 15 of shaft 19 and a second weight 5 is at an intermediate position between a respective resting lower position at the base 15 and a first upper position at or toward the top (not shown) of the shaft 19. First set of cables 7 comprising first opposing cables 21 and 23 are shown with first linkage members 25 for engaging with first linkage docks 27 on the first weight 3, but disengaged therefrom. As illustrated, linkage members 25 may be poised to be lowered by cables 7 (and associated winch, not shown) toward first weight 3 to engage therewith and then raise the first weight 3 under the control of winches (not shown) as part of a charging cycle (or energy storage cycle), or linkage members 25 may be poised to be raised by cables 7 past second weight 5 toward the top of the shaft 19 to engage with a third weight (not shown) as part of a discharge cycle. Second weight 5 is suspended, in the shaft 19 at a position between the base 15 and the top (not shown), by second set of cables 13 made up of second opposing cables 29 and 31 via second linkage members 33. Second weight 5 is poised to or is being raised by virtue of winches (not shown) associated with second set of cables 13 during a charge cycle or is being lowered to the base 15 during a discharge cycle. In either charge or discharge a free set of cables 7 and linkages 25 are required to pass, unhindered, the other (e.g. second) weight 5 and linkage 33 arrangement. Thereby, the first linkages 25 may be, for example, raised by the first set of cables 7 by winches (not shown) to engage a third weight (not shown) ready for lowering by the first set of cables 7 at around the time that the second weight 5 is rested or stacked on top of the first weight 3 at the base of the shaft 19. By this arrangement and method, continuous discharge (or, in the alternative, charge) can be achieved without interruptions characterising known multi-weight single shaft gravity-based energy storage systems. Assuming a discharge cycle, in which second weight 5 is being lowered by second set of cables 13, the second weight 5 will be stacked on top of first weight 3 at the base 15 of the shaft 19. Third weight (not shown) being fetched from the top of the shaft 19 by returning first set of cables 7 will be lowered and stacked on top of the second weight 5 at the base 15 of the shaft 19. The successive weights, stored in a stack at the base 15 of the shaft 19, will each have a shorter vertical passage than the preceding weight and those the release of stored energy by lowering each weight is less than the preceding one.

The first and second weights 3,5 (and subsequent weights) are of similar dimensions.

The winches preferably operate faster when raising or lowering free linkage members (e.g. 25) than linkage members (e.g. 33 attached to a weight (e.g. second weight, 5) in order that first linkage members 25 may be disengaged from first weight 3, return to the top of the shaft 19 and to engage with a next (third) weight (not shown) and begin to be lowered in the time it takes for second weight 5 to be lowered from top of the shaft 19 to the base 15. The same should occur with successive weights, whereby the interruption in power input/output is avoided.

Figure 2:
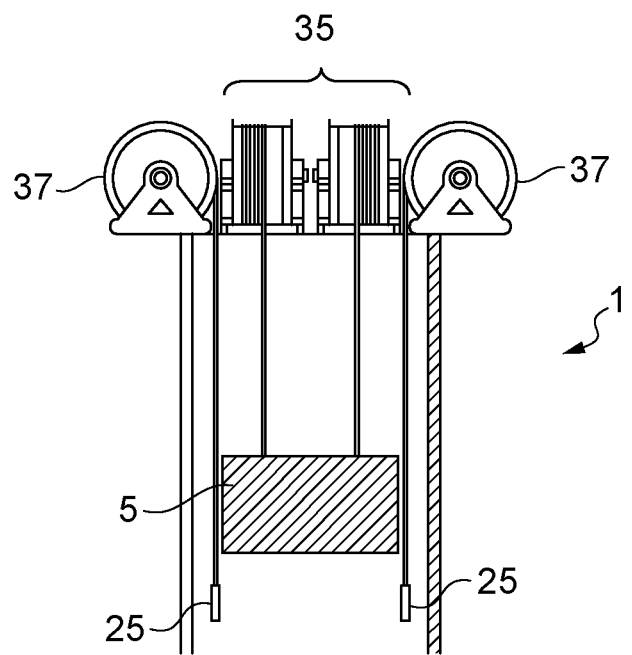
FIG. 2 illustrates in a side view of an energy storage system of an embodiment of the present invention.

In FIG. 2, a cross sectional side view of an energy storage arrangement 1 is illustrated in which second weight 5 is being lowered by second winch arrangement 35 while first linkage members 25 are being raised by first winch arrangement 37 for attachment with a third weight (not shown) to allow the discharge cycle to continue without interruption. The free linkage members 25 are configured to pass the lowering second weight 5 unhindered. Winch arrangements 35,37 are typically disposed on a surface surrounding to the top of shaft 19.

Figure 3:
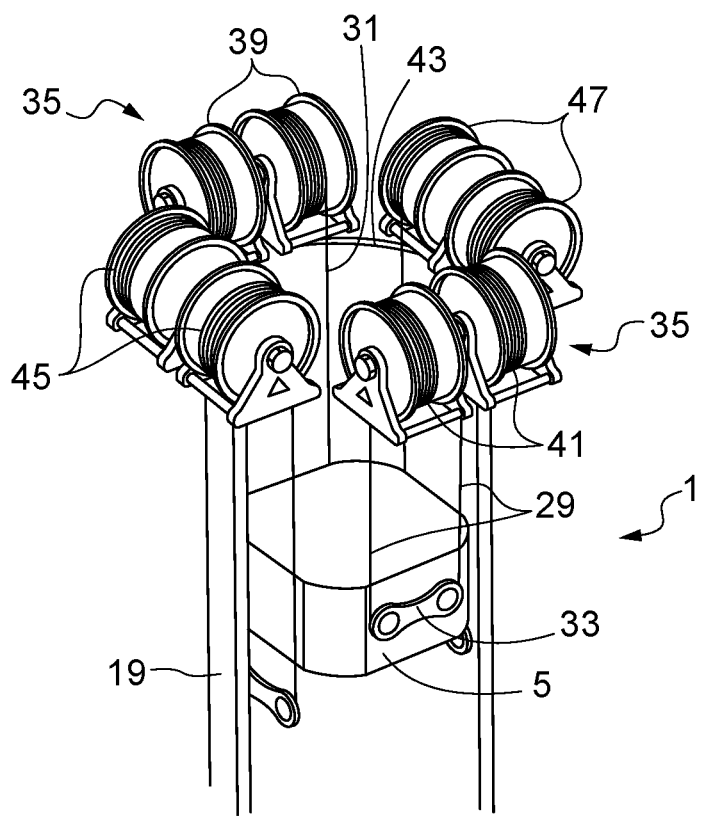
FIG. 3 illustrates in perspective view a representation of an embodiment of the energy storage system of the present invention showing an arrangement of winches.

FIG. 3 shows a preferred embodiment of the energy storage system 1 in a cutaway view of the top portion of shaft 19 in which a second weight 5 is illustrated being lowered by second winch arrangement 35. Second winch arrangement 35 comprises opposing cable pairs 29 and 31 upon which are disposed second linkage members 33, which are engaged with the second weight 5. The cable pairs 29 and 31 are lowered or raised by respective winch pairs 39, 41. Winch pairs 39, 41 are disposed opposite one another on the ground surface (not shown) either side of shaft rim 43. The winch pairs 45, 47 of first winch arrangement 37 are disposed orthogonal to winch pairs 39, 41, opposite one another on either side of shaft rim 43. Each pair of winches, 39,41,45,47 winches respective cables 29,31,21,23. The cables 29,31,21,23 are connected at either end to one of winches 39,41,45,47 and looped about linkage members 33,25. This ensures that any variation in winching by winches of each pair is accommodated by adjustment of the linkage member on the cable.

Figure 4:
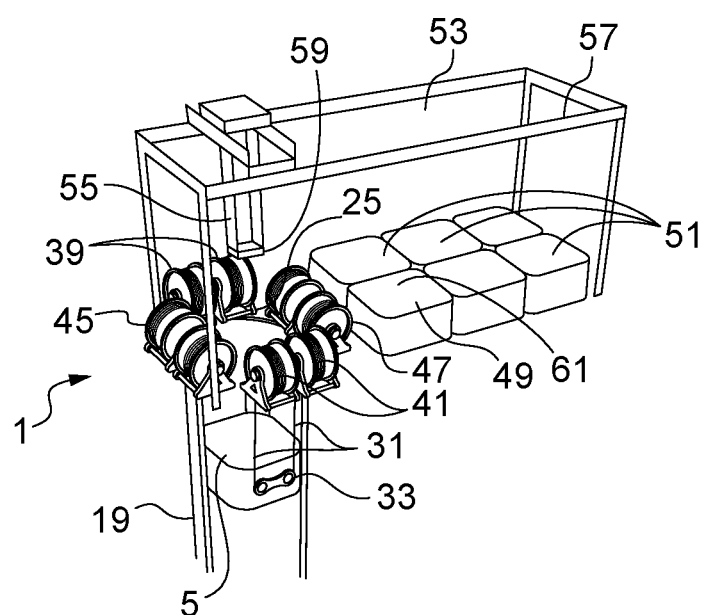
FIG. 4 illustrates in perspective view a representation of an embodiment of the energy storage system of the present invention showing a gantry storage arrangement.

FIG. 4 illustrates in perspective cutaway view an energy storage arrangement 1 according to an embodiment of the invention. The energy storage arrangement 1 comprises shaft 19 through which weights can be lowered and raised between top of shaft 19 and base 15. Two opposing winch pairs 39,41 operate to lower second weight 5 (via cables 29,31 and linkage members 33) toward the base 15 (not shown here) of shaft 19 while opposing winch pairs 45,47 operate to raise first linkage members 25 from the base 15 of shaft 19 where they have been released from recently lowered first weight 3 (as illustrated in other Figures). The first linkage members 25 are being raised back to the top of the shaft 19 in order to be engaged with a third weight 49 stored along with subsequent weights 51 in a storage area 53 to the side of the winches at the top of and outside of the shaft 19. An overhead crane 55 is provided to lift and drop third and subsequent weights 49,51 into or out of the shaft 19, through the top. A gantry arrangement 57 is provided for overhead crane 55 to travel along and engage a third weight 49 via engagement between crane linkage 59 on crane 55 and a corresponding weight linkage (not shown) on the top surface 61 of third weight 49 (and subsequent weights 51). The third weight 49 is lifted by crane 55, transported over the shaft 19, lowered between winches 39,41,45,47 into shaft 19 and ready for engagement with first linkage members 25 when they arrive at the top of the shaft 19. When linkage members 25 are engaged, the crane linkage 59 may be disengaged from the top surface 61 of third weight 49 and the third weight 49 lowered toward the base 15 (not shown).

FIGS. 5A to 5G illustrate linkage members 25 in disengaged configuration (FIGS. 5A to 5C) and engaged configuration (FIGS. 5D to 5G) with a first weight 3.

Figure 5A:
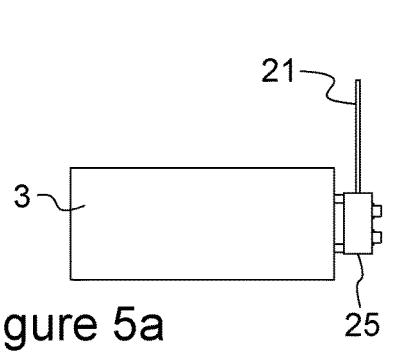
FIGS. 5A to 5G illustrate in front, side and cross-sectional and perspective views of a weight engaging and disengaging mechanism of a transporter linkage in disengaged and engaged configurations according to an embodiment of a system of the invention.
Figure 5B:
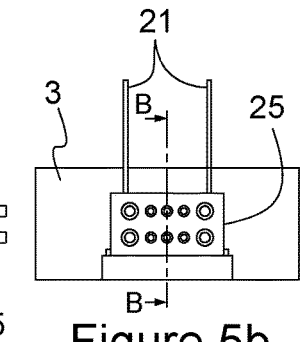
Figure 5C:
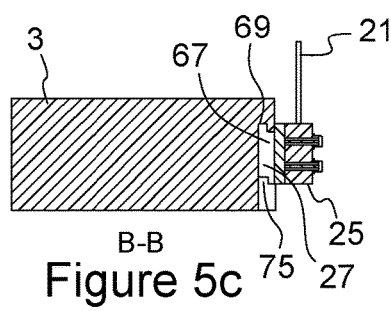
Figure 5D:
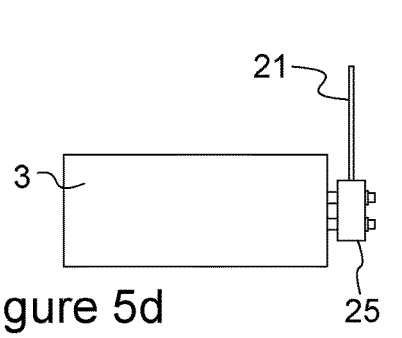
Figure 5E:
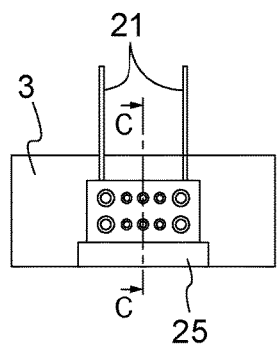

In FIGS. 5A to 5C, the linkage member 25 suspended from cable 21 is free to pass weight 3 without colliding therewith. Linkage member 25 comprises body 63 to which the cable 21 is mounted and cooperating sliding plate 65 disposed on the inner (weight-side) face of body 63. When linkage member 25 is aligned with a weight 3 and, in particular, a linkage dock 27 in the form of a recess on the weight 3, the sliding plate 65 may be caused to be displaced laterally from the body 63 and into the recess 67 of the linkage dock 27. The linkage member 25 may then be raised and the upper portion of sliding plate 65 engages slot 69 in the upper portion of recess 67 thereby locking the linkage member 25 into the linkage dock 27.

Figure 5F:
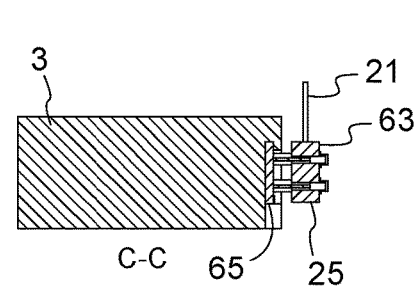
Figure 5G:
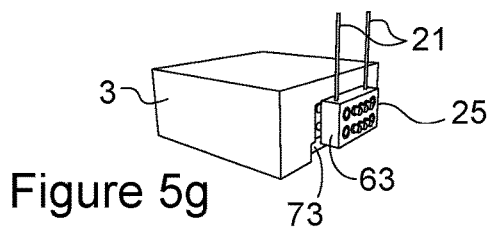
Figure 6:
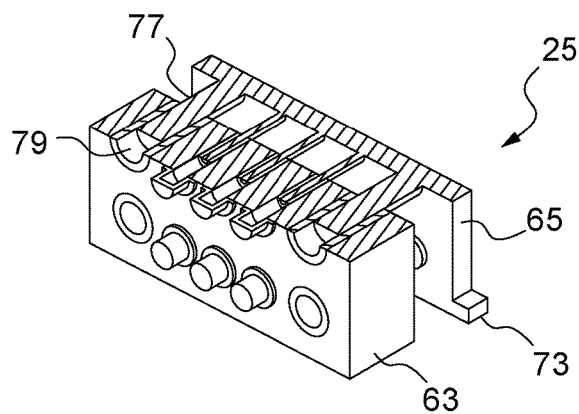
FIG. 6 illustrates in cut-away perspective view a transporter linkage of FIGS. 5A to 5G.

As can be seen in cross-sectional views in FIGS. 5C and 5F and also in FIG. 6, the sliding plate 65 is provided with six hydraulic actuators 77 that extend through bushes 79 formed in the body 63 and serve to control the movement of the sliding plate 65 away from and back to the body 63 and retain the sliding plate 65 in cooperative engagement with the recess 67 and slot 69. A lower edge of the sliding plate 65 is provided with lateral wings 73 which serve to inhibit rotation of the linkage member 25 when engaged into linkage dock 27 by cooperating with lateral slots 75 associated with the recess 67.

To release the linkage members 25 from the weight 3, the linkage members 25 are lowered relative to the weight 3 thus disengaging sliding plate 65 from slot 69 (and disengaging lateral wings 73 from lateral slots 75). The hydraulic actuators 77 are then operated to draw the sliding plate 65 back to contact with the body 63 at which point the linkage members 25 may be safely raised or lowered relative to the weight 3 without further contact.

Figure 7:
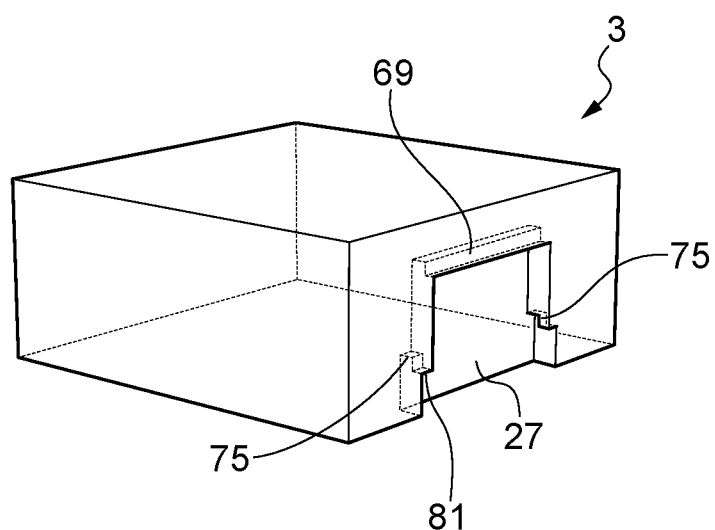
FIG. 7 illustrates in perspective view a transporter linkage of FIGS. 5 and 6 with transparency to illustrate a near side docking.

FIG. 7 illustrates in transparency a perspective view of a weight 3 showing one of the linkage docks 27 for receiving sliding plate 65. As can be seen, once the sliding plate 65 is disposed in the recess of linkage dock 27 and the linkage member 25 raised, the upper edge of the sliding plate 65 engages into slot 69 and, at the same time, lateral wings 73 on the sliding plate 65 engage into lateral slots 75 of the linkage dock 27. Abutting face 81 of each lateral slot 75 serves to abut lateral wings 73 and serves to counter potential rotational motion of the linkage member 25 once engaged with and lifting the weight due to the offset position of the sliding plate 65 and its engagement with the weight 3 from the resting centre of gravity of linkage member 25 suspended from cable 21.

Operation of a multi-weight gravity-based energy storage arrangement 1 is illustrated in FIGS. 8A to E. The energy storage arrangement 1 is configured with a controller (not shown) to control the movement of weights 3,5,49,51 between raised and lowered positions in a shaft 19 in order to store energy (by raising the weights) or release energy (by lowering the weights) according to the needs of an external system, typically an electricity grid. The system is charged by converting electrical power from the grid by way of motors, upon a signal from the controller, to drive winches 39,41,45 and 47 (illustrated in previous Figures) to raise weights 3,5,49,51 from relatively low positions to relatively high positions, typically in turn, but, in the case of a requirement for a short duration of high power, two weights at the same time for a short period. When a power demand is detected or requested from an external system, such as an electricity grid, the controller signals the winches 39,41,45, 47 to lower weights 3,5,49,51 from an raised (charged) position to a lowered (discharged) position and the gravitational potential energy release converted to electrical power by generators and exported to the external system. Again, the lowering of weights 3,5,49,51 is typically carried out in turn for continuous uninterrupted electricity output, but may be carried out two at one time to meet a short term high demand for power.

Figure 8A:
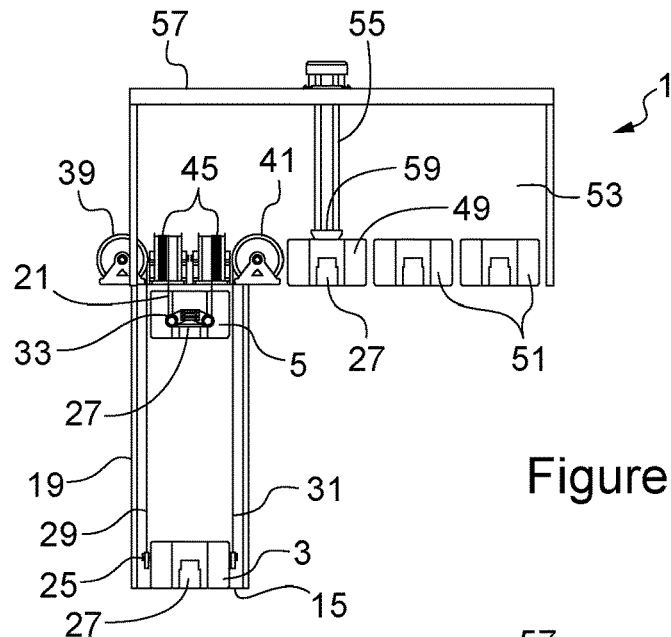
FIGS. 8A to 8E illustrate in a side cut-away view a sequence of steps illustrating the system of an embodiment of the invention during use.

In FIG. 8A, the arrangement 1 shows shaft 19 and disposed about the top of the shaft 19, opposing winch pairs 39,41 of one winch arrangement and opposing winch pairs 45,47 of a second winch arrangement. Weight 3 is resting at a base 15 of shaft 19 where it has just been lowered by opposing cable pairs 29,31 associated with winch pairs 39, 41 and attached to the weight 3 by way of first linkage members 25 engaged in corresponding linkage docks 27 on either side of weight 3. Weight 5 is disposed at the top of shaft 19 engaged with second linkage members 33 in linkage docks 27 on the front and back of weight 5 as viewed. The weight is suspended from cable pairs 21 and 23 (illustrated in earlier Figures) associated with winch pair 45, 47. Weight 5 is poised ready to be lowered. Third weight 49 and further weights 51 are stored in surface storage area 53 to the side of and outside shaft 19. A gantry arrangement 57, with overhead crane 55, is provided to transport weights 49,51 between the surface storage area 57 and a position of engagement with linkage members 25,33 at the top of shaft 19 as required.

Figure 8B:
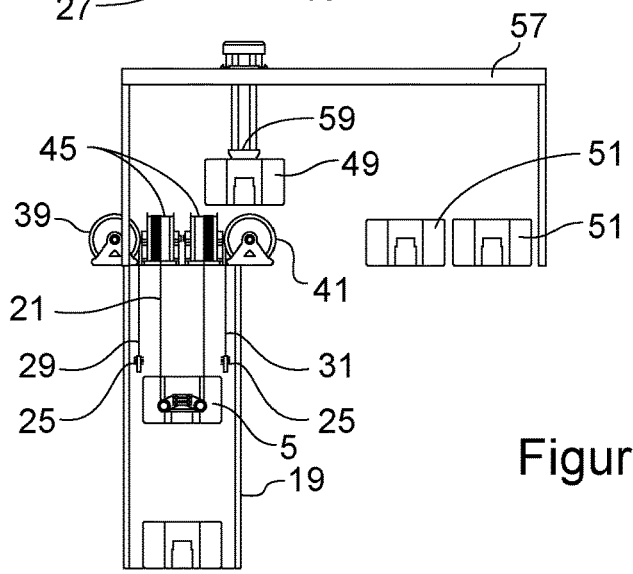
Figure 8C:
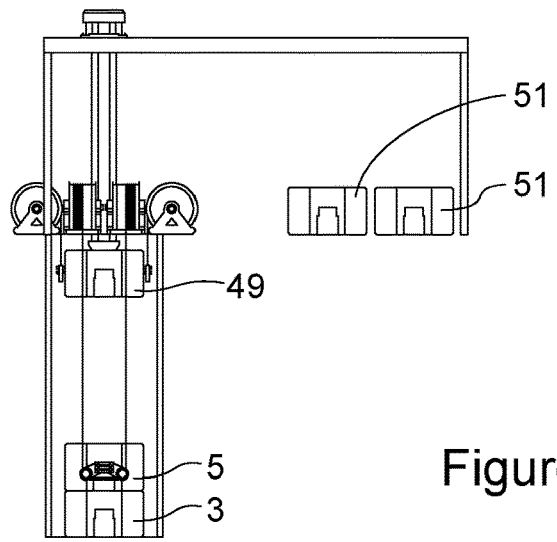

Upon a signal from the controller (not shown) for an extended power output requirement to an external system, winch pair 45, 47 lowers weight 5 down shaft 19, as shown in FIG. 8B. At the same time, winch pair 39,41 is signalled to raise cable pair 29,31 and first linkage members 25 having been released from weight 3. Cable pair 29,31 is raised at a faster rate than the lowering of weight 5 in order that they can be raised to the top of the shaft, connect with third weight 49 and start to be lowered before weight 5 reaches its resting position. Also concurrently, the controller (not shown) signals crane 55 engaged with third weight 49 via crane linkage 59 and the top of weight 49 to lift weight 49 and transport it via gantry 57 to a position above the shaft 19 ready for use. Weight 49 can then be lowered by the crane 55 through a gap between opposing pairs of winches 39,41, 45,47 which is sufficient to allow passage of the weight 49 and, held at the top of shaft 19, just below the winches 45, 47, engaged with the recently raised first linkage members 25 (via linkage docs 27 on each side of weight 49) and when securely engaged released by crane linkage 59. This process should all be completed during the period in which weight 5 is lowered such that as second weight 5 reaches its lower resting position stacked on top of first weight 3 at the base 15 of the shaft 19 (illustrated in FIG. 8C), third weight 49 can start to be lowered thus allowing continuity of power output from the arrangement 1 without interruption.

Figure 8D:
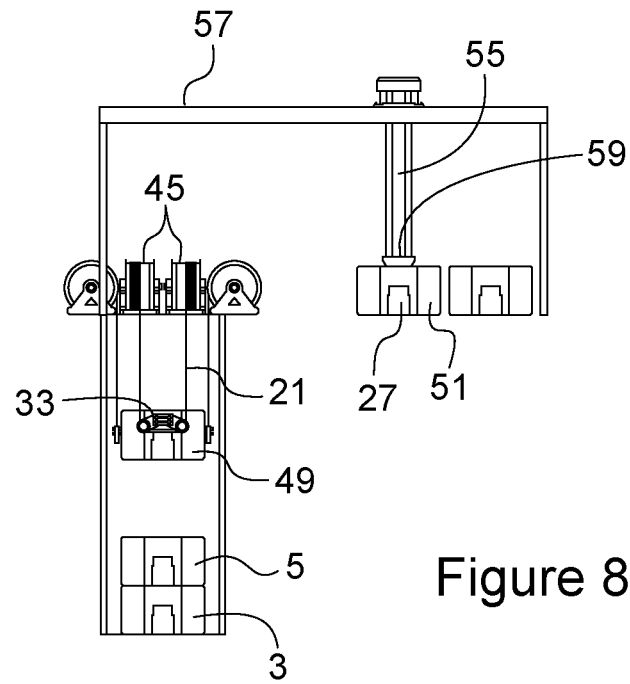
Figure 8E:
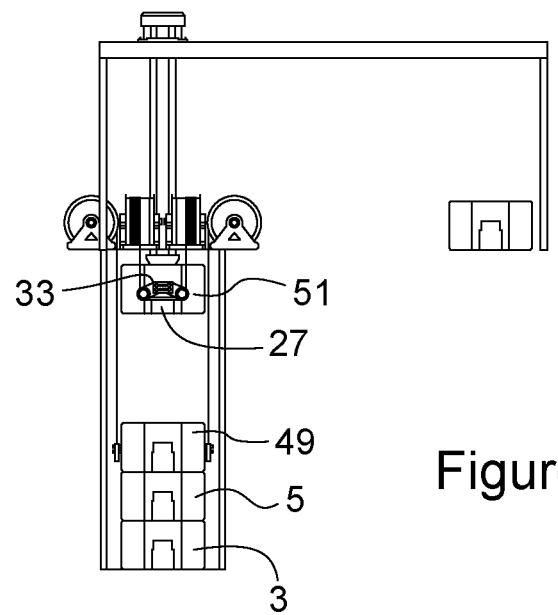

As illustrated in FIG. 8D, as the third weight 49 is lowered, second linkage members 33 and cable pair 21,23 are raised, at a faster rate, by winch pair 45,47 so as to meet and engage with further weight 51, which is being engaged by crane 55 via crane linkage 59 for transport to the top of the shaft 19 by gantry 57. Again, the raising linkage members 33 can pass lowering weight 49 without collision, so that they can be disposed at the top of the shaft 19 and engaged to weight 51 via linkage docks 27 and ready to be released by crane 55 and lowered to discharge further energy to the external system when third weight 49 reaches is resting lower position stacked on top of second weight 5 at the base 15 of shaft 19.

Thus, the arrangement 1 provides significantly enhanced energy capacity with smaller and more cost effective lifting means for a given shaft 19 by making use of multiple weights 3,5,49,51 and can provide continuity of energy input/output from/to an external system by use of two weight/cable arrangements over the whole energy capacity of the arrangement 1 without interruption.

Figure 9:
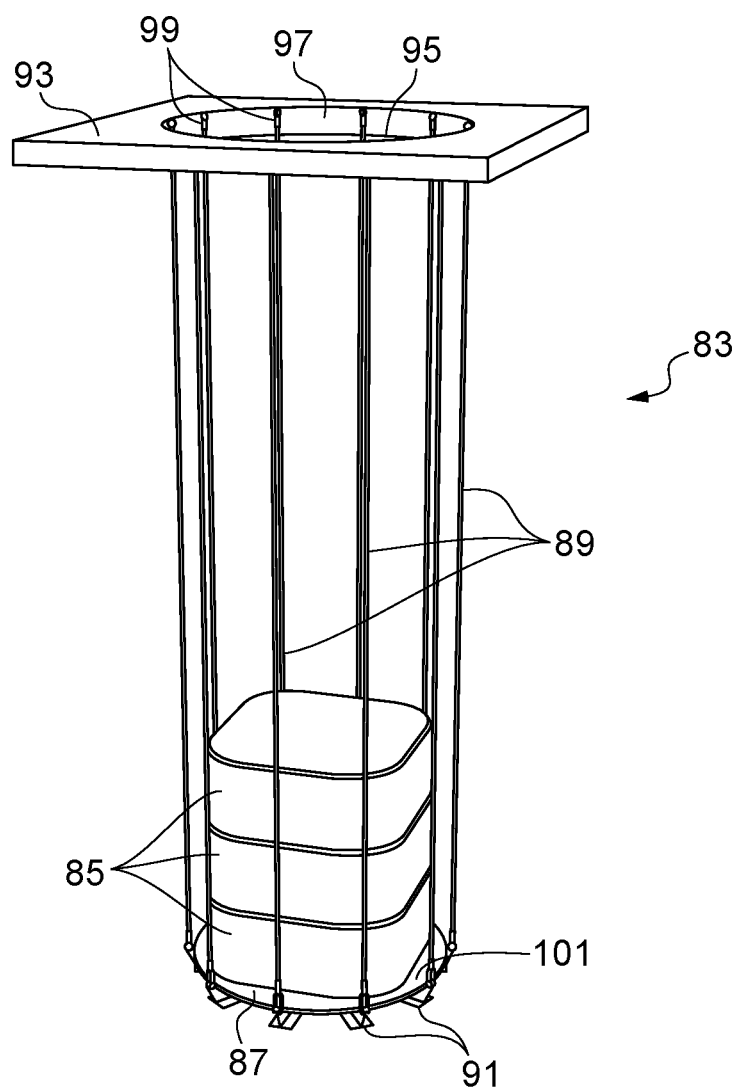
FIG. 9 is a perspective view of a suspended weight support system of another aspect and of a preferred embodiment of the energy storage system.

In FIG. 9, which illustrates a suspended platform system 83 of one aspect of the invention for disposal in a shaft (not shown) for the raising and lowering of weights 85 for use in an energy storage system described in more detail above. A platform element 87 is suspended (typically in a shaft) by ten cable suspension members 89 affixed to peripherally disposed brackets 91 themselves affixed to the underside of the platform element 87 and extending about the periphery of the platform element 87. The cable suspension members 89 may be affixed at their opposing ends to an anchor support 93 in the form of a spreader plate for disposing on the ground on the surface over a shaft (not shown) and having an aperture 95 formed therein which should generally coincide with a shaft opening (not shown). A rim 97 about aperture 95 may be provided with a plurality of fixings or brackets 99 to which the cable suspension members may be secured. Weights 85 may be disposed, in a discharged configuration of an energy storage system, on the upper surface 101 of platform element 87.

The invention has been described with reference to a preferred embodiment. However, it will be appreciated that variations and modifications can be effected by a person of ordinary skill in the art without departing from the scope of the invention.

The invention claimed is:

1. A multi-weight gravity-based energy storage system comprising:
   a first weight;
   a second weight;
   a first transporter comprising a first transporter linkage which may be coupled to and decoupled from the first weight for mechanically linking the first weight to the first transporter, the first transporter configured for transporting the first weight along a first pre-defined path defining a vertical displacement between a first upper position and a second lower position;
   a second transporter comprising a second transporter linkage which may be coupled to and decoupled from the second weight for mechanically linking the second weight to the second transporter, the second transporter configured for transporting the second weight along a second pre-defined path defining a vertical displacement between a first upper position and a second lower position;

a first path volume defined by the area of the first weight coupled with the first transporter linkage developed or swept along the first pre-defined path;

a second path volume defined by the area of the second weight coupled with the second transporter linkage developed or swept along the second pre-defined path, wherein at least a portion of the second path volume overlaps with the first path volume; and a second linkage path volume defined by the area of the second linkage decoupled from a weight and developed or swept along a respective pre-defined path between an upper position and a lower position, wherein the second linkage path volume does not overlap with the first path volume.

2. The energy storage system of claim 1, wherein the at least a portion of the second path volume overlaps with the first path volume by an amount of at least 20% of the first path volume.

3. The energy storage system of claim 1, wherein the first pre-defined path and the second pre-defined path each define a vertical path between a first upper position and a second lower position.

4. The energy storage system of claim 1, wherein the first and second pre-defined paths follow the path of a shaft, which is preferably a shaft in the ground.

5. The energy storage system of claim 4, wherein the shaft has a depth of from 100 m to 2000 m.

6. The energy storage system of claim 1, wherein the first transporter and the second transporter each comprise a winch and cable arrangement.

7. The energy storage system of claim 6, wherein the first transporter comprises a first winch and cable arrangement and the second transporter comprises a second winch and cable arrangement discrete from the first winch and cable arrangement.

8. The energy storage system of claim 6, wherein each winch and cable arrangement comprises one or more transporter linkages for coupling and decoupling from respective weights.

9. The energy storage system of claim 8, wherein each winch and cable arrangement comprise two opposing pairs of winches, disposed on opposing sides of a shaft entrance, each opposing pair of winches cooperating with a cable arrangement and at least one transporter linkage.

10. The energy storage system of claim 1, wherein each transporter linkage comprises a linkage member for cooperating with a respective linkage dock on a weight.

11. The energy storage system of claim 10, wherein the linkage member is adaptable between a first configuration in which it is coupled with a linkage dock on a weight and second configuration in which it is decoupled from a linkage dock on a weight.

12. The energy storage system of claim 1, further comprising:

a first linkage path volume defined by the area of the first linkage decoupled from a weight and developed or swept along a respective pre-defined path between an upper position and a lower position, wherein the first linkage path volume does not overlap with the second path volume.

13. The energy storage system of claim 1, which further comprises a third weight and optionally further weights, wherein the first and/or second transporter may be coupled to each of the third and optional further weights to secure respective mechanical linkages and configured for transporting the third and optional further weights along a third or further pre-defined paths defining a vertical displacement between a first upper position and a second lower position.

14. The energy storage system of claim 13, wherein the system comprises at least 5 weights.

15. The energy storage system of claim 1, which has a fully charged configuration in which all the weights have been raised to their respective upper positions and fully discharged configuration in which all the weights have been lowered to their respective lower positions.

16. The energy storage system of claim 15, wherein, when in the fully discharged configuration, the first weight, when decoupled from a respective transporter, is disposed on a base of the shaft within the first path volume, the second weight, when decoupled from its respective transporter, is disposed on top of the first weight at the base of the shaft within the second path volume and any third or further weights are disposed or stacked on the respective preceding weight at the bottom of the shaft within the respective path volume.

17. The energy storage system of claim 15, wherein, when in the fully discharged configuration, the decoupled first weight is stored in a base storage space associated with the shaft outside of the first path volume and preferably the decoupled second and any third or further weights are stored in a storage space associated with the shaft outside of the respective path volumes.

18. The energy storage system of claim 17, wherein a base storage conveyor is provided to transport each of the first weight and the second and any third or further weights from their respective lower positions to a storage space outside their respective path volumes.

19. The energy storage system of claim 18, wherein the storage conveyor is a conveyor belt or a carousel.

20. The energy storage system of claim 15, wherein, when in a fully charged configuration, the first weight, decoupled from its respective transporter, is stored within the first path volume at its upper position, the second weight, when decoupled from its respective transporter, is disposed adjacent the first weight within the second path volume at its upper position and any third or further weights are disposed adjacent the respective preceding weight within the respective path volume at the respective upper position.

21. The energy storage system of claim 15, wherein, when in a fully charged configuration, the first weight, decoupled from its respective transporter, is stored in an upper storage space outside of the first path volume, the second weight, decoupled from its respective transporter, is stored in an upper storage space outside of the second path volume and any third or further weights are stored in an upper storage space outside of the respective path volumes.

22. The energy storage system of claim 21, wherein an upper storage conveyor is provided to transport each of the first weight and the second and any third or further weights from their respective upper positions to a storage space outside their respective path volumes.

23. The energy storage system of claim 22, wherein the upper storage conveyor comprises a gantry crane and matrix storage arrangement and/or a carousel.

24. The energy storage system of claim 1, which comprises an input connection and an output connection.

25. The energy storage system of claim 1, which comprises a controller for controlling the operation of the transporters and movement of the weights in response to a requirement for storage of excess energy from or discharge of energy to an external system.

26. The energy storage system of claim 25, wherein the controller is configured to cause the system to slow the rate of raising or lowering of a weight as it approaches an extremity of its path and start another weight moving so as to compensate for the reduction in power input/output resulting from the first weight slowing and stopping at the end of its path, whereby the input/output from the system can be provided at required power on a continuous basis for the duration of the raising or lowering of at least two successive weights.

27. A method of energy storage in a multi-weight gravity-based energy storage system for providing continuity of power input and/or output to the system without interruption or discontinuity across the full energy capacity thereof, the method comprising providing a multi-weight gravity-based energy storage system as defined in claim 1 and operating the energy storage system so as to cause the raising and lowering of successive weights according to a power input/output requirement for the system and cause the system to slow the rate of raising or lowering of a weight as it approaches an extremity of its path and start another weight moving so as to compensate for the reduction in power input/output resulting from the first weight slowing and stopping at the end of its path, whereby the input/output from the system can be provided at required power on a continuous basis for the duration of the raising or lowering of at least two successive weights.

28. A method of energy storage in a multi-weight gravity-based energy storage system comprising at least two weights configured for raising and lowering along respective pre-defined paths by way of transporters and which system comprises a controller for controlling the operation of the transporters and movement of the weights in response to a requirement for storage of energy from or discharge of energy to an external system, the method comprising moving at least two weights along their pre-defined paths simultaneously in order to provide a short duration increased power input/output.

* * * * *